(12) United States Patent
Ichihashi

(10) Patent No.: US 9,620,102 B1
(45) Date of Patent: Apr. 11, 2017

(54) STEPPED ACOUSTIC STRUCTURES WITH MULTIPLE DEGREES OF FREEDOM

(71) Applicant: Hexcel Corporation, Dublin, CA (US)

(72) Inventor: Fumitaka Ichihashi, Chandler, AZ (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 15/144,355

(22) Filed: May 2, 2016

(51) Int. Cl.
*G10K 11/168* (2006.01)
*G10K 11/16* (2006.01)
*B64D 33/02* (2006.01)
*F02C 7/045* (2006.01)

(52) U.S. Cl.
CPC ............ *G10K 11/168* (2013.01); *B64D 33/02* (2013.01); *F02C 7/045* (2013.01); *G10K 11/161* (2013.01); *B64D 2033/0206* (2013.01)

(58) Field of Classification Search
CPC .... G10K 11/168; G10K 11/161; B64D 33/02; F02C 7/045
USPC ................................................ 181/292, 229
See application file for complete search history.

(56) References Cited

U.S. PATENT DOCUMENTS

| | | | | |
|---|---|---|---|---|
| 4,265,955 A * | 5/1981 | Harp | ..................... | B29D 24/005 181/292 |
| 4,327,816 A * | 5/1982 | Bennett | ................ | G10K 11/172 181/224 |
| 5,445,861 A * | 8/1995 | Newton | .................... | B32B 3/12 181/290 |
| 5,785,919 A | 7/1998 | Wilson | | |
| 5,997,985 A * | 12/1999 | Clarke | ...................... | B32B 3/12 181/286 |
| 6,085,865 A * | 7/2000 | Delverdier | ................ | B32B 3/12 181/286 |
| 6,615,950 B2 | 9/2003 | Porte et al. | | |
| 7,311,175 B2 * | 12/2007 | Proscia | ................... | F01D 25/30 181/214 |
| 7,337,875 B2 * | 3/2008 | Proscia | ................... | F02C 7/045 181/210 |

(Continued)

OTHER PUBLICATIONS

The Modeling and Experimental Validation of the Acoustic Impedance of Multi-Degrees-of-Freedom-Liners, Syed et al., American Institute of Aeronautics and Astronautics, AIAA 2008-2927.

*Primary Examiner* — Forrest M Phillips
(74) *Attorney, Agent, or Firm* — W. Mark Bielawski; David J. Oldenkamp

(57) ABSTRACT

A stepped acoustic structure having multiple degrees of acoustic freedom for reducing noise generated from a source. Acoustic septum caps are anchored at the same depth within the cells of the stepped acoustic structure. The multiple degrees of acoustic freedom that is usually provided by locating the septum portions of the septum caps at different depths within the cells is obtained by placing steps within the cells which reduce the cross-sectional area of the cell. Depth control portions are optionally included in the septum caps so that the septum portions of different septum caps are located at different depths within the stepped acoustic structure. Various combinations of steps and depth control portions are used to provide an acoustic structure having multiple degrees of acoustic freedom even though the acoustic septum caps are anchored at the same depth within the structure.

20 Claims, 9 Drawing Sheets

(56) References Cited

U.S. PATENT DOCUMENTS

| | | | | |
|---|---|---|---|---|
| 7,434,659 B2 * | 10/2008 | Ayle | ............... | F02C 7/045 |
| | | | | 181/284 |
| 7,510,052 B2 | 3/2009 | Ayle | | |
| 8,413,761 B2 * | 4/2013 | Ayle | ............... | G10K 11/172 |
| | | | | 181/292 |
| 8,607,924 B2 | 12/2013 | Ichihashi | | |
| 8,651,233 B2 | 2/2014 | Ayle | | |
| 8,733,500 B1 * | 5/2014 | Ayle | ............... | G10K 11/172 |
| | | | | 181/284 |
| 8,800,714 B2 | 8/2014 | Ichihashi | | |
| 8,997,923 B2 * | 4/2015 | Ichihashi | ............... | B32B 3/10 |
| | | | | 181/292 |
| 9,068,345 B2 * | 6/2015 | Ichihashi | ............... | E04B 1/84 |
| 9,334,059 B1 * | 5/2016 | Jones | ............... | B64D 33/02 |
| 2005/0109557 A1 * | 5/2005 | Dravet | ............... | G10K 11/172 |
| | | | | 181/292 |
| 2013/0062143 A1 * | 3/2013 | Ichihashi | ............... | G10K 11/172 |
| | | | | 181/292 |
| 2013/0341119 A1 * | 12/2013 | Ichihashi | ............... | G10K 11/172 |
| | | | | 181/207 |
| 2015/0041247 A1 * | 2/2015 | Ichihashi | ............... | B32B 3/10 |
| | | | | 181/292 |
| 2015/0041248 A1 * | 2/2015 | Ichihashi | ............... | E04B 1/84 |
| | | | | 181/292 |

* cited by examiner

STEPPED ACOUSTIC STRUCTURES WITH MULTIPLE DEGREES OF FREEDOM

BACKGROUND OF THE INVENTION

1. Field of the Invention

The present invention relates generally to acoustic structures that are used to attenuate noise that emanates from a specific source. More particularly, the present invention is directed to providing acoustic structures that have multiple degrees of acoustic freedom.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine.

Honeycomb has been a popular material for use in aircraft and aerospace vehicles because it is relatively strong and lightweight. For acoustic applications, such as engine nacelles, acoustic materials are added to the honeycomb structure so that the honeycomb cells are acoustically closed at the end located away from the engine and covered with a porous covering at the end located closest to the engine. The closing of the honeycomb cells with acoustic material in this manner creates an acoustic resonator that provides attenuation, damping or suppression of the noise. Acoustic septums are also usually incorporated into the interior of the honeycomb cells in order to provide the resonator with additional noise attenuation properties.

One way of incorporating acoustic septums into the honeycomb cells is to first form planar acoustic inserts from an acoustic material, such as an acoustic mesh or perforated acoustic film. The planar acoustic inserts are made larger than the cell openings. Accordingly, when the inserts are pushed into the cells with a plunger, they are folded into an acoustic septum in the form of a cap. The cap shape provides an anchoring portion that contacts the cell walls and a central septum portion which attenuates the sound waves in the cell. Once inserted into the cells, the friction between the anchoring portion of the acoustic septum cap and the honeycomb walls temporarily locks the acoustic septum cap in place. An adhesive is then used to permanently bond the anchoring portions of the inserted acoustic septum caps to the cell walls.

The permanent bonding of the acoustic septum caps is accomplished by dipping the entire honeycomb into a pool of liquid adhesive. The depth to which the honeycomb is dipped into the adhesive is chosen so that the anchoring portions of the inserted acoustic septum caps are immersed in the liquid adhesive. This adhesive dip process is particularly effective because it provides simultaneous bonding of the many hundreds of acoustic septums that are located within a typical honeycomb acoustic structure.

In many acoustic situations, it is desirable to have honeycomb where the cells have different acoustic damping properties. For example, the depth at which the septum cap is anchored within each cell can be varied to provide cells with different acoustic impedance. These types of acoustic structures are referred to as having multiple degrees of acoustic freedom due to the variability in acoustic impedance of the cells.

The honeycomb that is used in acoustic panels for attenuating noise generated by an aircraft engine is typically from 1 to 3 inches (2.5 to 7.5 cm) thick with cells having cross-sectional areas of from 0.05 to 1 square inch (0.32 to 6.4 cm). The walls of the honeycomb are typically from 0.001 to 0.05 inch thick (0.002 to 0.13 cm). There are a number of challenges associated with anchoring septum caps at different cell depths in the honeycomb cells in order to form an acoustic structure with multiple degrees of acoustic freedom. These challenges depend in part on the desired distance between the various septum cap depths within the honeycomb cells. Locating septum caps at depths within the cell that differ from each other over a relatively wide range, such as from 0.25 to 2 inch (0.64 to 5 cm) presents problems and challenges which are different from the situation where the range of septum cap depths is relatively small, such as from 0.01 to 0.25 inch (0.025 to 0.64 cm).

When the desired difference in septum depths is relatively large, the anchoring portions of the septum caps do not overlap each other. As a result, multiple applications of adhesive are required. For example, when three groups of septa are inserted at three different depths over a relatively wide range, the first group of septum caps must be inserted to the deepest depth and then bonded in place by dipping the honeycomb into the pool of adhesive. Each dipping process leaves a film of adhesive over the entire honeycomb wall that is immersed in the pool of adhesive. After the adhesive for the first group of septum caps has solidified, the second group of septum caps is inserted to the middle depth and bonded in place by dipping again into the pool of liquid adhesive. After the second film of adhesive has solidified, the third group of septum caps is inserted to the shallowest depth and bonded in place by dipping yet again into the pool of liquid adhesive. As a result, three partially overlapping films of adhesive must be applied to the honeycomb walls in order to locate septum caps at three different depths.

The multiple adhesive films that are required to bond acoustic septums at different depths in the honeycomb causes an increase in the weight of the acoustic structure and may even alter the physical properties of the honeycomb. In addition, insertion of the second and third groups of planar acoustic inserts may be difficult due to the buildup of adhesive on the cell walls.

A different challenge is presented when the desired differences in septum cap depths is relatively small. In these situations, the anchoring portions of the different groups of septum caps overlap to some degree so that a single application of adhesive may or may not be sufficient to bond all of the septum caps in place. Instead of reducing the number of adhesive applications, the challenge becomes how to accurately place the septum caps at multiple depths that may differ in placement by only 0.010 to 0.25 inch (0.025 to 0.64 cm).

In some acoustic applications, it may be desirable to locate septum caps within the same honeycomb at cell depths which differ over both a relatively small range and a relatively large range. In these situations, both of the above challenges regarding limiting adhesive applications and accurately placing the septum caps become significant.

SUMMARY OF THE INVENTION

In accordance with the present invention, it was discovered that a stepped acoustic structure, in which the septum caps are anchored at the same depth within the honeycomb cells, can provide the same multiple degrees of acoustic freedom that was previously obtained by locating the septum caps at different depths within the cells. The stepped acoustic structure is obtained by inserting or otherwise forming a step within the honeycomb cell that reduces the acoustic surface area of the septum portion of the septum cap. It was found that the reduction in cross-sectional area of the cell provided by the step causes changes in acoustic impedance that closely match the changes that are achieved by making relatively small reductions in the depth of the septum portion within the cell.

The above feature of the present invention, allows one making a multi-degree-of-freedom acoustic structure the ability to eliminate the challenge inherent in anchoring septum caps at depths which differ by only 0.010 to 0.25 inch (0.025 to 0.64 cm). Instead, the septum caps are anchored at the same depth and steps are included in the cells to reduce the cross-sectional area of the cells to closely match the acoustic impedance profiles that would otherwise be achieved by making relatively small decreases in the depth of the septum portion.

As another feature of the present invention, depth control portions are included in the septum caps so that the septum portions of different septum caps can be located at different depths within the stepped acoustic structure even though the septum caps are anchored at the same depth. This feature allows one making a multi-degree-of-freedom acoustic structure the ability to eliminate the need for multiple adhesive applications when it is desired to anchor the septum caps at depths which differ by relatively large distances, for example, on the order of 0.25 inch (0.64 cm) and greater.

When the above features of the present invention involving the use of area-limiting steps and depth control portions are combined, it is possible to produce a variety of multi-degrees-of-freedom acoustic structures where the acoustic impedance of the resonators vary widely while at the same time using only a single application of adhesive to accurately anchor the septum caps at the same depth within the structure.

The present invention is based in part on a stepped acoustic structure in which acoustic septum caps are located in the cells so that the acoustic impedance of at least two of the cells is different. This provides the stepped-acoustic structure with multiple degrees of freedom for reducing the noise generated from a source. The stepped acoustic structure includes a honeycomb having a first edge that is located closest to the source of noise and a second edge. The honeycomb is formed by a plurality of walls that extend between the first and second edges of the honeycomb. The walls form at least a first and second cell wherein each of the cells has the same cross-sectional area measured perpendicular to the walls. An acoustic barrier is located at the second edge of the honeycomb so that the cells form acoustic resonators where the depth of each of acoustic resonators is equal to the distance between the first edge of the honeycomb and the acoustic barrier.

A first acoustic septum cap is located in one of the cells. The first acoustic septum cap includes a first anchor portion for anchoring the first acoustic septum cap to the walls of the cell. The first anchor portion has an outer edge and a first anchor boundary that is spaced from the outer edge a first anchoring distance. The first anchor portion is bonded to the walls and extends parallel thereto. The first anchor boundary is located at a first anchor depth within the cell. The first acoustic septum also includes a first septum portion that extends transverse to the walls of the cell. The first septum portion is located at a first septum depth such that the cell forms a first acoustic resonator which has a first acoustic impedance.

A second acoustic septum cap is located in another cell. The second acoustic septum cap includes a second anchor portion for anchoring the second acoustic septum cap to the walls of the cell. The second anchor portion has an outer edge and a second anchor boundary that is spaced from the outer edge a second anchoring distance. The second anchor portion is bonded to the walls and extends parallel thereto. The second anchor boundary is located at a second anchor depth within the cell so that the second anchor depth is equal to the first anchor depth. The second acoustic septum also includes a second septum portion that extends transverse to the walls of the cell. The second septum portion is located at a second septum depth within the cell such that the cell forms a second acoustic resonator.

As a feature of the present invention, a step is provided to reduce the cross-sectional area of the cell at the second septum depth. The cross-sectional area is reduced a sufficient amount so that the second acoustic resonator has a second acoustic impedance that is sufficiently different from the first acoustic impedance to provide the stepped acoustic structure with multiple degrees of freedom for reducing the noise generated from a source.

As another feature of the invention, when the first septum depth is equal to the second septum depth, the step is used to reduce the cross-sectional area of the cell at the second septum portion a sufficient amount so that the second acoustic impedance matches the acoustic impedance that would be provided by the first resonator if the first septum portion was located closer to the first edge of said honeycomb than said second septum portion. This feature allows one to accurately locate the septum portions at the same depth in the cells while using steps to provide localized variations in the cell cross-sectional area in order to match the acoustic impedances that were previously obtained by decreasing the septum depth over distances on the order of 0.010 to 0.25 inch (0.025 to 0.64 cm).

As a further feature of the present invention, a depth control portion is located between septum portion and anchor portion of the first septum cap and/or the second septum cap. The first depth control portion extends parallel to the cell walls and includes an exterior boundary that coincides with the first anchor boundary. The depth control portion also includes a first septum boundary located around the septum portion. The septum boundary is spaced from the exterior boundary a depth control distance. The depth control distance may be varied over a relatively wide range so that the first septum depth and second septum depth can vary up to 1 inch (2.5 cm) or more. This feature allow one to use the step to fine tune effective septum depth while the depth control portion is used to achieve greater variations in actual septum depths. In addition, steps can be used to reduce the difference in depth control distance needed to achieve a desired difference in acoustic impedance between cells.

The above described and many other features and attendant advantages of the present invention will become better understood by reference to the following detailed description when taken in conjunction with the accompanying drawings.

DETAILED DESCRIPTION OF THE INVENTION

Figure 1:
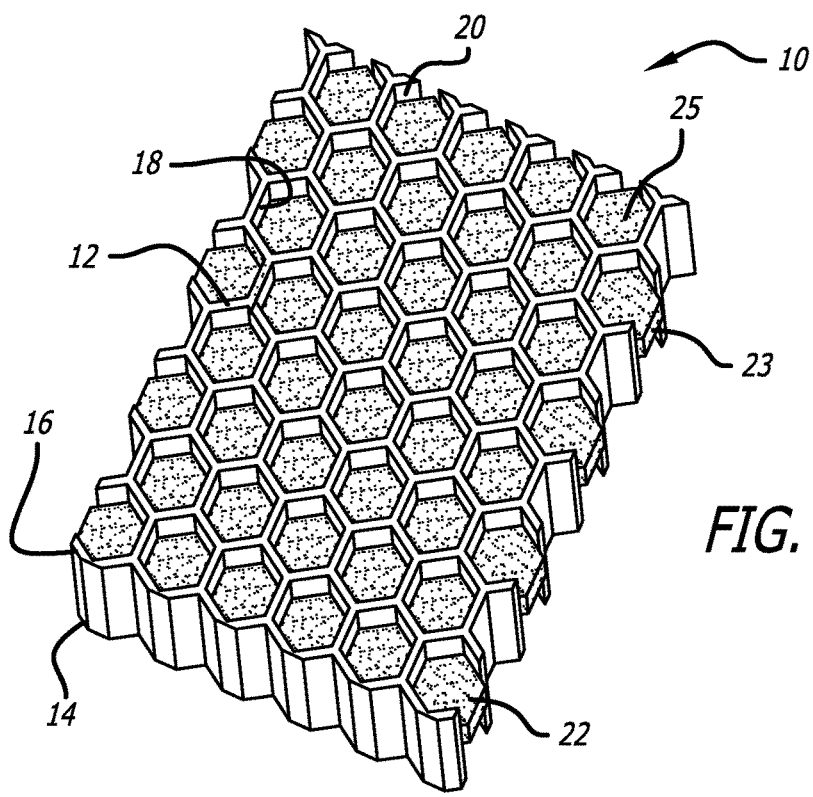
FIG. 1 is a perspective view of an exemplary stepped acoustic structure in accordance with the present invention.

An exemplary stepped acoustic honeycomb for use in an acoustic structure in accordance with the present invention is shown generally at 10 in FIG. 1. The stepped acoustic honeycomb 10 includes a honeycomb 12 having a first edge 14 which is to be located nearest the noise source and a second edge 16. The stepped acoustic honeycomb 10 includes walls 18 that extend between the two edges 14 and 16 to define a plurality of cells 20. Each of the cells 20 has a depth (also referred to as the core thickness) that is equal to the distance between the two edges 14 and 16. Each cell 20 also has a cross-sectional area that is measured perpendicular to the cell walls 18.

Figure 13:
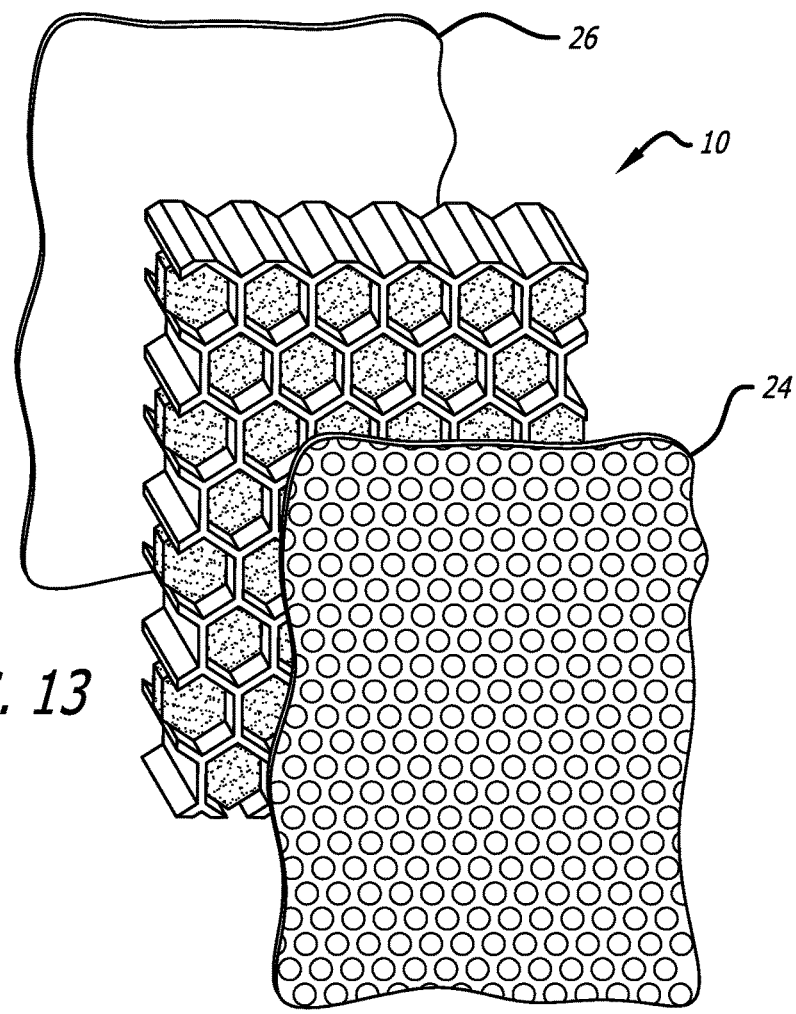
FIG. 13 is an exploded view showing the acoustic honeycomb prior to being bonded to an acoustic barrier panel on one side and a sound permeable mesh on the other.

As shown in FIG. 13, the stepped acoustic honeycomb 10 is typically located between a porous face sheet 24 and a solid acoustic barrier face sheet 26. The solid acoustic barrier face sheet 26 forms an acoustic barrier at the bottom of the acoustic cells 20 that corresponds to the second edge 16 of the honeycomb 12. Each cell forms an acoustic resonator that has a depth which is equal to the distance between the first edge 14 and second edge 16. Individual acoustic barriers may be inserted into the cells 20 when it is desired that the acoustic bottom of the cells does not correspond to the second edge 16 of the honeycomb 10. The insertion of solid barriers into the cells allows one to form acoustic resonators, when desired, that have depths that are less than the distance between the first edge 14 and second edge 16 of the honeycomb 12.

Acoustic septum caps 22 are located in each of the cells 20. The septum caps 22 have an anchoring portion 23 that is bonded to the cell walls and a septum portion 25 that extends transversely across the cell. The anchoring portion 23 is preferably located nearest to the first edge 14 of the honeycomb as shown in FIG. 1. However, if desired, the orientation of the septum cap 22 within the cell may be reversed so that the anchoring portion 23 is nearest to the second edge 16 and solid acoustic barrier 26, as shown in FIG. 13.

The present invention is directed to making stepped acoustic honeycomb 10 where the septum portions 25 of the septum caps 22 are located at the same insertion depth and steps are provided in some of the cells to achieve acoustic impedances that match the acoustic impedances that would otherwise be obtained by reducing the insertion depth of the septum portions. The stepped acoustic honeycomb exhibits multiple degrees of acoustic freedom.

In addition, the present invention is directed to stepped acoustic honeycomb in which a depth control portion is located between the anchoring portion 23 and septum portion 25 of the septum cap 22. Varying the depth control portion allows one keep the anchor portions at the same depth in the cells while locating the septum portions at different depths to provide an acoustic structure having multiple degrees of freedom. The addition of steps to the cells also allows one to reduce differences in the sizes of the depth control portions between various cells while keeping a close match between the impedance profiles.

Figure 3:
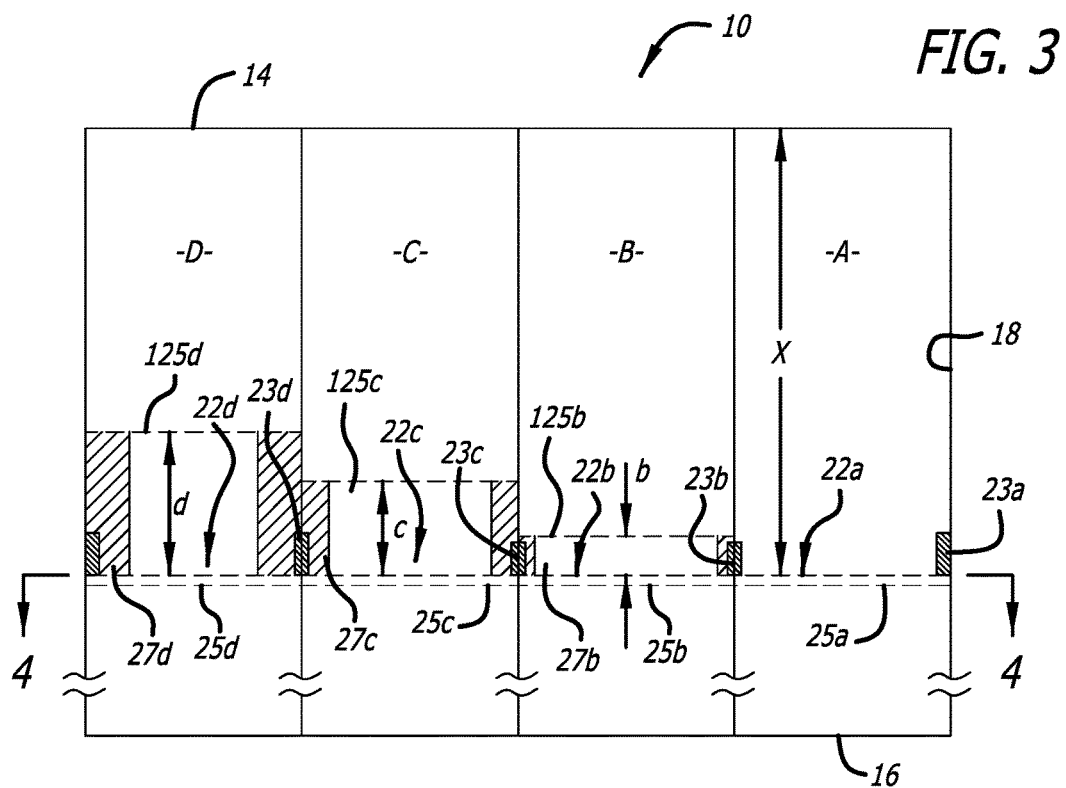
FIG. 3 is a side diagrammatic view showing a stepped acoustic honeycomb having four cells where three of the cells include a step.
Figure 4:
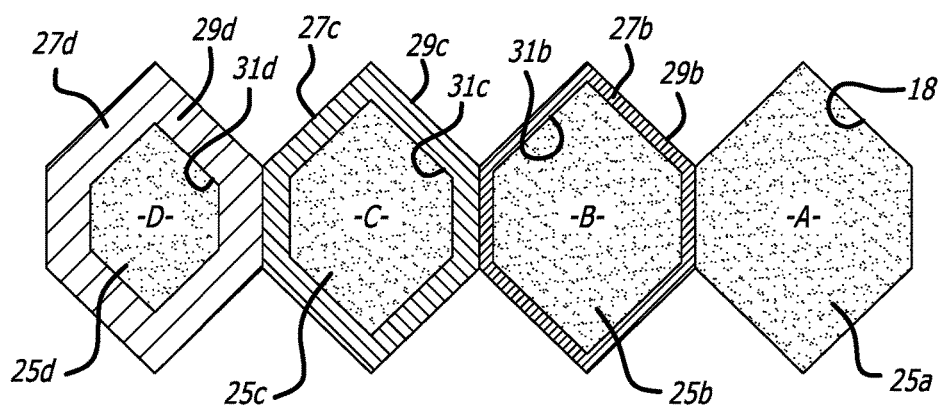
FIG. 4 is a top diagrammatic view of FIG. 3 showing the three different steps which each provides a different reduction in cell cross-sectional area. One is a 20% step that leaves 80% of the septum exposed and active. A second one is a 40% step that leaves 60% of the septum exposed and active. A third one is a 60% step that leaves 40% of the septum exposed and active.

FIG. 3 is a diagrammatic side view of four exemplary cells A, B, C and D which are located in the acoustic honeycomb 10. Each of the cells has the same cross-sectional area as shown in FIG. 4, which is equal to the cross-sectional area of cell A. Septums caps 22a, 22b, 22c and 22d are located in cells A, B, C and D, respectively. The septum portions 25a, 25b, 25c and 25d are located at the same insertion depth or septum depth (x).

In accordance with the present invention, steps 27b, 27c and 27d are located in cells B, C and D, respectively, to provide a reduction in the cross-sectional areas of the cells that extends for a certain distance within the cells. Step 27b is in the form of a cylindrical insert that extends from the septum portion 25b towards the first edge 14 to provide a 20% reduction in cell cross-sectional area compared to cell A. Step 27c is in the form of a cylindrical insert that extends from the septum portion 25c towards the first edge 14 to provide a 40% reduction in cell cross-sectional area compared to cell A. Step 27d is in the form of a cylindrical insert that extends from the septum portion 25d towards the first edge 14 to provide a 60% reduction in cell cross-sectional area. The three step reductions of 20%, 40% and 60% are only for exemplary purposes. The steps may be used to reduce the cross-sectional area of the cells to any percentage over a range of from 10 to 85% of the cross-sectional area of the un-stepped cell (A).

The steps 27b, 27c and 27d can be made in any number of ways provided that the desired degree of reduction in cross-sectional area is achieved over the desired distance within the cell. A preferred way is to insert cylinders 27b, 27c and 27d that have an exterior edge 29b, 29c and 29d that matches the shape of the cell walls, so that the cylinders can be inserted into the cells and accurately friction fit to the desired septum depth. The cylinders each have an interior edge 31b, 31c and 31d that is spaced from the exterior edge the distance required to achieve the desired cylinder wall thickness and resulting reduction in cell cross-sectional area. This approach allows one to use the same septum caps for all of the cells with cylinders of varying thickness and lengths being inserted to provide the desired reductions in cell cross-sectional area.

The walls of the cylindrical inserts may be uniformly thick so that the cross-sectional shape of the interior edge matches the exterior edge. Alternatively, the walls can be non-uniformly thick so that the interior edge and exterior edge have different cross-sectional shapes. For example, the exterior edge can be hexagonal to match the cell walls while the interior edge has a circular cross-section. It is preferred that the reduction in cell cross-sectional area provided by the cylindrical insert is constant over the entire length of the cylindrical insert.

The length of the cylindrical insert may be varied to produce minor changes in the impedance profile of the cell. The cylinder length should be at least as long as the anchoring portion of the septum cap and may be as long as the distance between septum portion and first edge. The length of cylindrical insert 27d is shown being longer than the lengths of cylindrical inserts 27b and 27c. This is for exemplary purposes only with it being understood that the cylinder length may be varied to achieve desired minor changes in the impedance profile of the cell.

The cylindrical insert may be placed in the cell after the septum cap has been inserted and positioned within the cell. Alternatively, the cylindrical insert may be combined with the septum cap prior to insertion so that the combined cylindrical insert and septum cap is inserted and friction fit within the cell in a single step.

The exemplary steps 27b, 27c and 27d shown in FIGS. 3 and 4 provide cells B, C and D which have acoustic impedance properties or plots which closely match the plots that would be achieved if non-stepped septum portions were located within their respective cells as shown at 125b, 125c and 125d. The distance between the actual septum depth and the effective depth of the septum portion is shown as b, c and d in cells B, C and D, respectively.

Step 27b (20% reduction in cross-sectional area compared to cell A) provides an effective decrease in septum depth such that the acoustic impedance of cell B closely matches the acoustic impedance of cell A if the septum portion 25a is located at a septum depth of (x−b). Step 27c (40% reduction in cross-sectional area compared to cell A) provides an effective decrease in septum depth such that the acoustic impedance of cell C closely matches the acoustic impedance of cell A if the septum portion 25a is located at a septum depth of (x−c). Step 27d (60% reduction in cross-sectional area compared to cell A) provides an effective decrease in septum depth such that the acoustic impedance of cell D closely matches the acoustic impedance of cell A if the septum portion 25a is located at a depth of (x−d).

Acoustic simulation and modelling studies were performed based on four cells of a honeycomb 10, as represented in FIG. 1 that is 1.50 inch (3.81 cm) thick (distance between edges 14 and 16). The septum cap material was acoustic mesh having an acoustic resistance of 80 rayl (R) and a non-linear factor (NLF) of 1.6. The simulation and modelling used a temperature at 76.5° F. (24.7° C.), pressure 14.0 pounds per square inch (psi) (0.98 kilograms per square centimeter) and a sound source having an overall sound pressure level (OASPL) of 135 dB.

In the first study, the cylindrical steps 27b, 27c and 27d were located and sized as shown in FIGS. 3 and 4. The septum depths were all equal to x where x=0.450 inch (1.14 cm). In a second study, no steps were added to the cells so that the cross-sectional areas of cells and the septum portions were all the same. The same septum cap material that was used in the first study was also used in the second study. In the second study, the septum caps were located to provide a cell B' where the septum depth was 0.400 inch (1.01 cm) (b=0.050 inch (0.13 cm)), a cell C' where the septum depth was 0.350 inch (0.89 cm) (c=0.100 inch (0.26 cm)) and a cell D' where the septum depth was 0.300 inch (0.76 cm) (d=0.150 inch (0.38 cm)).

Acoustic impedance (Z) is close to the real part (R) of the acoustic impedance plus the imaginary part (X) where X is multiplied by an imaginary number (i) (Z=R+iX). In both studies, plots or profiles of acoustic impedance (Z) were obtained which show how R and X vary over frequencies from 0 to 5000 Hz.

Figure 5:
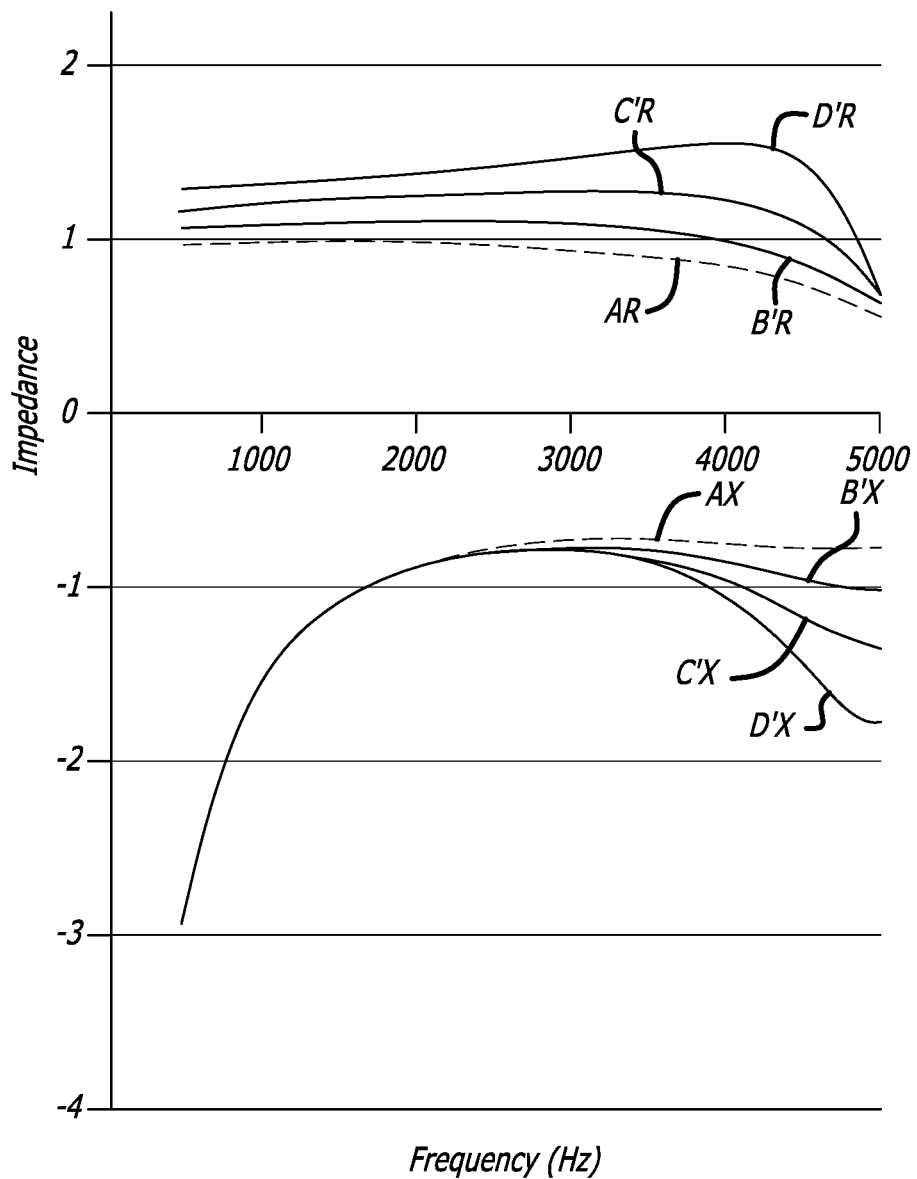
FIG. 5 is a graph of showing the variations in impedance plots that occurs by changing the septa depth from 0.300 inch (0.762 cm) to 0.450 inch (1.14 cm).

FIG. 5 shows the impedance plots for cells or resonators A, B', C' and D'. The real part of impedance (R) is shown in curves AR, B'R, C'R and D'R for cells A, B', C' and D', respectively. The corresponding imaginary part of impedance (X) is shown in curves AX, B'X, C'X and D'X. As can be seen from the curves, reducing the septum depth in increments of 0.050 inch (0.13 cm) from 0.450 inch (11.4 cm) in cell A to 0.300 inch (0.76 cm) in cell D' produces impedance plots that are different. The differences in impedance plots in FIG. 5 would be expected to provide an acoustic structure with multiple degrees of freedom.

Figure 6:
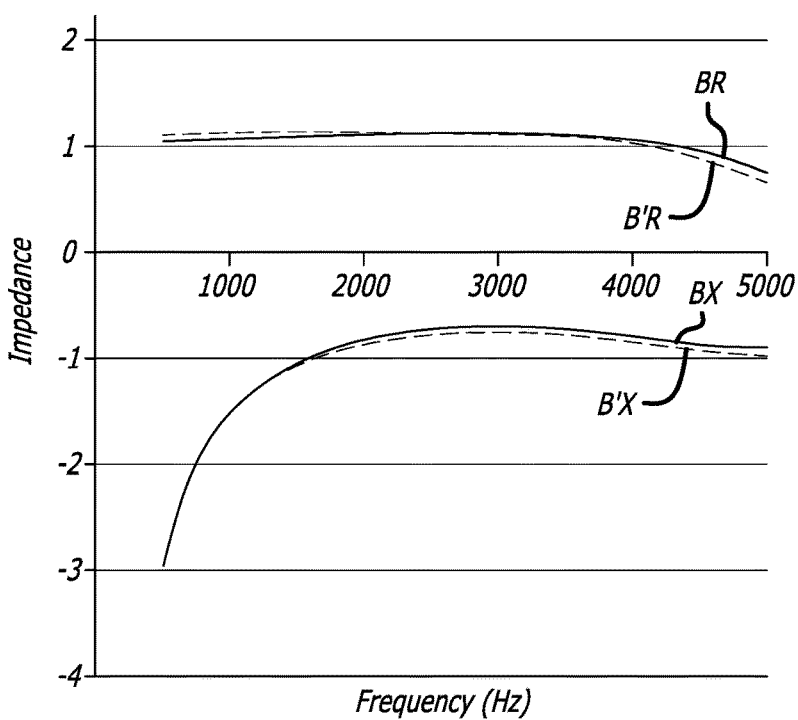
FIG. 6 is a graph showing that the impedance plot of a 20% stepped cell with a septum depth of 0.450 inch (1.14 cm) matches the impedance plot of a non-stepped cell with a septum depth of 0.400 inch (1.02 cm).

FIG. 6 shows the impedance plot for cell B from the first study where the curve for the real part of impedance is shown as BR and the curve for the imaginary part of impedance is shown at BX. As shown in FIG. 6, the impedance plot for cell B closely matches the impedance plot for cell B'. Accordingly, the reduction in cell cross-sectional area (20') provided by step 27b provides an acoustic impedance profile that closely matches the profile that is obtained by moving the septum portion of cell A 0.050 inch (0.13 cm) closer to the cell edge 14 (b=0.050 inch (0.13 cm)).

Figure 7:
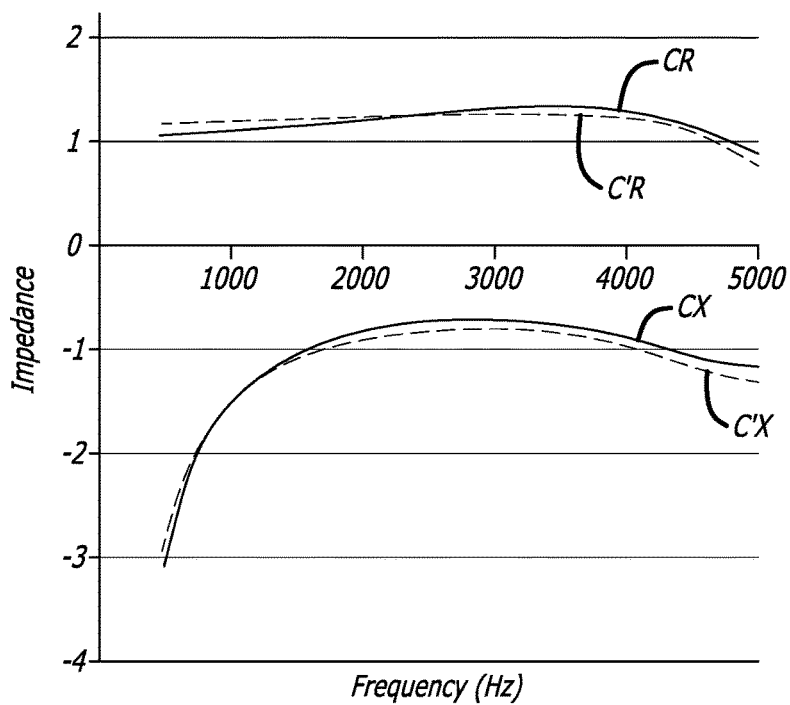
FIG. 7 is a graph showing that the impedance plot of a 40% stepped cell with a septum depth of 0.450 inch (1.14 cm) matches the impedance plot of a non-stepped cell with a septum depth of 0.350 inch (0.889 cm).

FIG. 7 shows the impedance plot for cell C from the first study where the curve for the real part of impedance is shown as CR and the curve for the imaginary part of impedance is shown at CX. As shown in FIG. 7, the impedance plot for cell C closely matches the impedance plot for cell C'. Accordingly, the reduction in septum cross-sectional area (40%) provided by step 27c provides an acoustic impedance profile that closely matches the profile that is obtained by moving the septum portion of cell A 0.100 inch (0.25 cm) closer to the cell edge 14 (c=0.100 (0.25 cm)).

Figure 8:
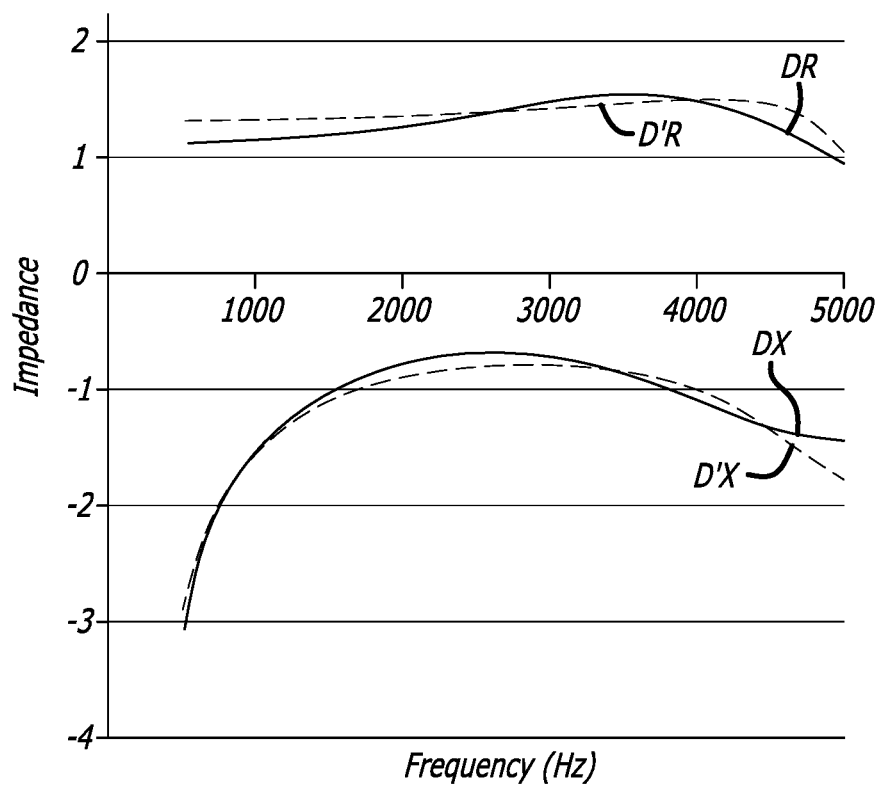
FIG. 8 is a graph showing that the impedance plot of a 60% stepped cell with a septum depth of 0.450 inch (1.14 cm) matches the impedance plot of a non-stepped cell with a septum depth of 0.300 inch (0.762 cm).

FIG. 8 shows the impedance plot for cell D from the first study where the curve for the real part of impedance is shown as DR and the curve for the imaginary part of impedance is shown at DX. As shown in FIG. 8, the impedance plot for cell D closely matches the impedance plot for cell D'. Accordingly, the reduction in septum cross-sectional area (60%) provided by step 27d provides an acoustic impedance profile that closely matches the profile that is obtained by moving the septum portion of cell A 0.150 inch (0.38 cm) closer to the cell edge 14 (d=0.150 (0.38 cm)).

The exemplary steps 27b and 27c and 27d show that reductions in cell cross-sectional areas of from 20 to 60% result in effective changes in septum depth of from 0.050 inch (0.13 cm) to 0.15 inch (0.38 cm). It is expected that steps which reduce the cross-sectional area of the cell up to 85% may be used to provide effective changes in septum depth of up to 0.25 inch (0.64 cm). The impedance plots shown in FIGS. 6-8 are examples of what is considered in accordance with the present invention to be acoustic impedance profiles that closely match each other.

In those acoustic structures where the desired multiple degrees of freedom can be obtained by varying the septum depths by a difference of up to 0.250 inch (0.635 cm), the required multiple degrees of freedom can be provided in accordance with the present invention by using steps to reduce the cross-sectional area of the cell portion by up to 85% and locating the septum portions at the same septum depth.

In other situations, it is desirable that the multiple degrees of freedom provided by the acoustic structure be obtained by differences in septum depth that are greater than 0.025 inch (0.64 cm). In these situations a depth control portion is included in the septum cap between the anchor portion and the septum portion.

Figure 2:
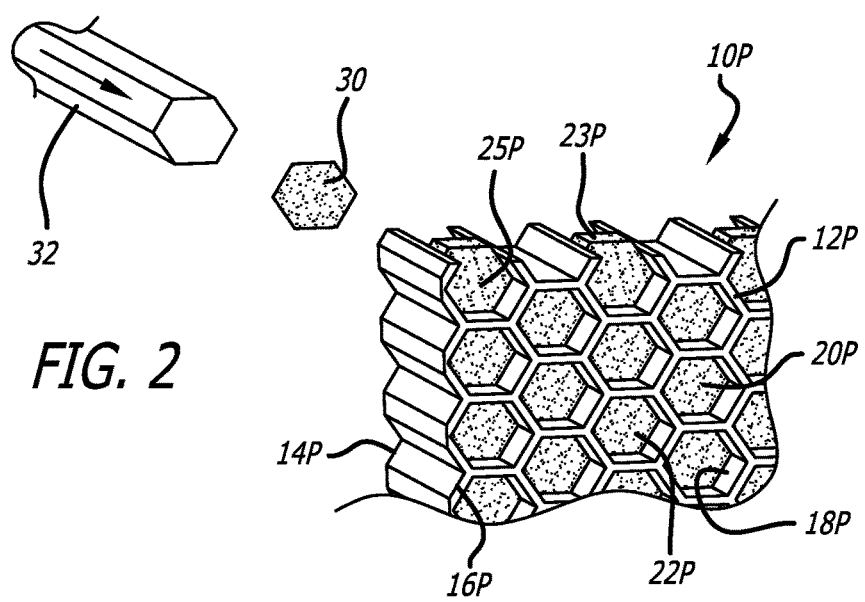
FIG. 2 is a simplified view showing how a planar acoustic insert is pressed into an acoustic honeycomb to form an acoustic septum cap that is friction-locked within the honeycomb cell.

As shown in FIG. 2, the septum caps 22P are formed from planar acoustic inserts 30 that are pressed with a plunger 32 into a honeycomb 10P. The identifying numbers in FIG. 2 correspond to the numbers in FIG. 1, except that a P is added to indicate that the honeycomb is a precursor structure that still requires permanent bonding of the septum caps 22P in order to form the final acoustic honeycomb 10. The acoustic inserts 30 are larger than the cell openings so that they are formed into a cap shape during insertion into the cells 20P. The resulting septum caps are friction-locked in place by the inherent bounce back of the acoustic insert material. If desired, numerous plungers can be used to simultaneously insert numerous planar acoustic inserts. The septum caps 22P typically include an anchor portion 23P which extends parallel to the cell walls 18P and a septum portion 25P that extends transverse to the cell walls 18P.

Figure 9:
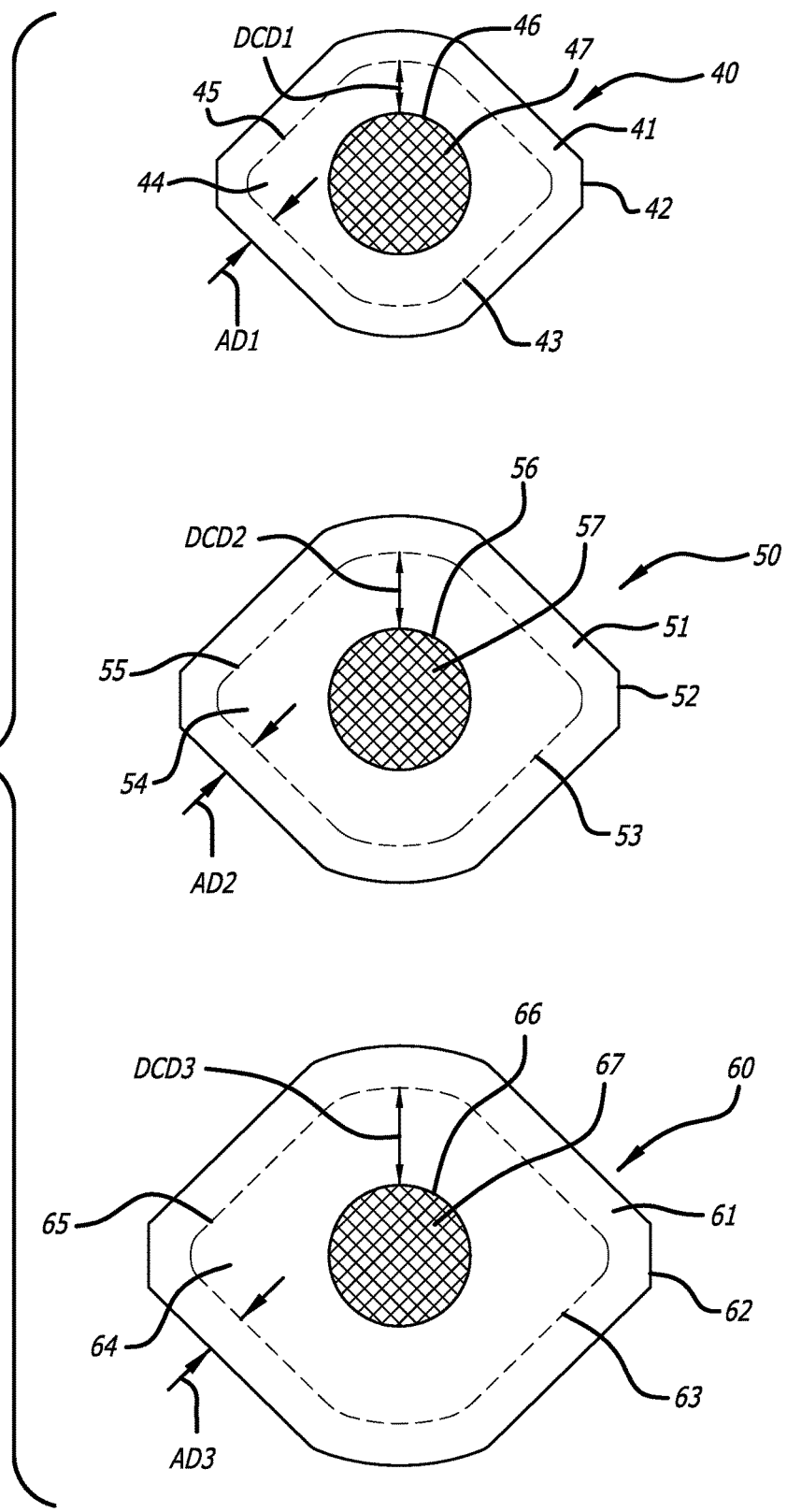
FIG. 9 shows an exemplary set of planar acoustic inserts in accordance with the present invention which each includes a depth control portion.

Planar acoustic inserts, which include a depth control portion, are used in the same manner as acoustic inserts 30 to form an acoustic structure having multiple degrees of freedom for reducing noise generated from a source. An exemplary set of three planar acoustic inserts that each includes a depth control portion is shown in FIG. 9. The set includes: a first planar acoustic septum 40; a second planar acoustic septum 50; and a third planar acoustic septum 60. There must be at least two different planar acoustic inserts (e.g. 40 and 50) in the set in order to form an acoustic structure having multiple degrees of freedom. The number of different acoustic inserts in the set may be greater than three. A set of three acoustic inserts is described herein for exemplary purposes with it being understood that the number of different acoustic inserts in a set is only limited by the multiple degrees of freedom that are desired for a given acoustic structure. In addition, it will be recognized that that the number of a particular type of planar acoustic insert (e.g. 40, 50 or 60) that is inserted into any given acoustic honeycomb can range up to a thousand or more.

The first planar acoustic insert 40 includes a first anchor portion 41 that has an outer edge 42 that defines the perimeter of the first acoustic insert 40 and a first interior boundary shown in phantom at 43. The first interior boundary 43 is spaced inward from the outer edge 42 a first anchoring distance shown at AD1. The first acoustic insert 40 also includes a first septum depth control portion 44. The exterior boundary 45 of the first septum depth control portion 44 coincides with the first interior boundary 43 of the first anchor portion 41. The first septum depth control portion 44 also includes a first septum boundary 46 that is spaced inward from the exterior boundary 45 a first depth control distance DCD1. A first septum portion 47 is located in the center of the first acoustic insert 40. The perimeter of the first septum portion 47 is attached to the first septum control portion 44 along septum boundary 46.

The second planar acoustic insert 50 includes a second anchor portion 51 that has an outer edge 52 that defines the perimeter of the second acoustic insert 50 and a second interior boundary shown in phantom at 53. The second interior boundary 53 is spaced inward from the outer edge 52 a second anchoring distance shown at AD2. The second acoustic insert 50 also includes a second septum depth control portion 54. The exterior boundary 55 of the second septum depth control portion 54 coincides with the second interior boundary 53 of the second anchor portion 51. The second septum depth control portion 54 also includes a second septum boundary 56 that is spaced inward from the exterior boundary 55 a second depth control distance DCD2. A second septum portion 57 is located in the center of the second acoustic insert 50. The perimeter of the second septum portion 57 is attached to the second septum control portion 54 along septum boundary 56.

The third planar acoustic insert 60 includes a third anchor portion 61 that has an outer edge 62 that defines the perimeter of the acoustic insert 60 and a third interior boundary shown in phantom at 63. The third interior boundary 63 is spaced inward from the outer edge 62 a third anchoring distance shown at AD3. The acoustic insert 60 also includes a third septum depth control portion 64. The exterior boundary 65 of the third septum depth control portion 64 coincides with the third interior boundary 63 of the third anchor portion 61. The third septum depth control portion 64 also includes a third septum boundary 66 that is spaced inward from the exterior boundary 65 a third depth control distance DCD3. A third septum portion 67 is located in the center of the third acoustic insert 60. The perimeter of the third septum portion 67 is attached to the third septum control portion 64 along septum boundary 66.

The anchoring distances AD1, AD2 and AD3 are preferably the same for each of the acoustic inserts. The anchoring distance is preferably the same as it is for the acoustic inserts that do not include a depth control portion. Typical anchoring distances are, for example, from 0.10 inch (0.25 cm) to 0.0.70 inch (1.8 cm). It is not necessary that the anchoring distances are the same provided that the interior boundaries 43, 53 and 63 are located within the honeycomb at the same depth. For example, AD3 can be greater than either AD2 or AD1 to provide extra bonding surface for the larger acoustic insert 60. However, the interior boundary 63 of the anchor portion 61 should be located at the same depth within the honeycomb cells as the interior boundaries 43 and 53 of septum caps 41 and 51, respectively. Accordingly, the anchor or anchoring depth of a septum cap with a depth control portion is considered to be the location of the interior boundary of the anchor portion once the acoustic insert has been placed within a cell.

In accordance with the present invention, the depth control portions are used when it is desired to provide resonators with septum depth that differ by relatively large distances, such as from 0.25 inch (0.64 cm) to 1.0 inch (2.5 cm) or more. These relatively large septum depth differences are achieved by varying the depth control distances DCD1, DCD2 and DCD3 between 0.25 inch (0.64 cm) and 1.0 inch (2.5 cm). The different depth control distances result in the septum portions being located at different depths in the honeycomb to provide multiple degrees of acoustic freedom. Locating the interior boundaries of the anchor portions at the same depth allows the septum caps to be anchored using a single dip in adhesive while at the same time locating the septum portions at different depths.

Figure 10:
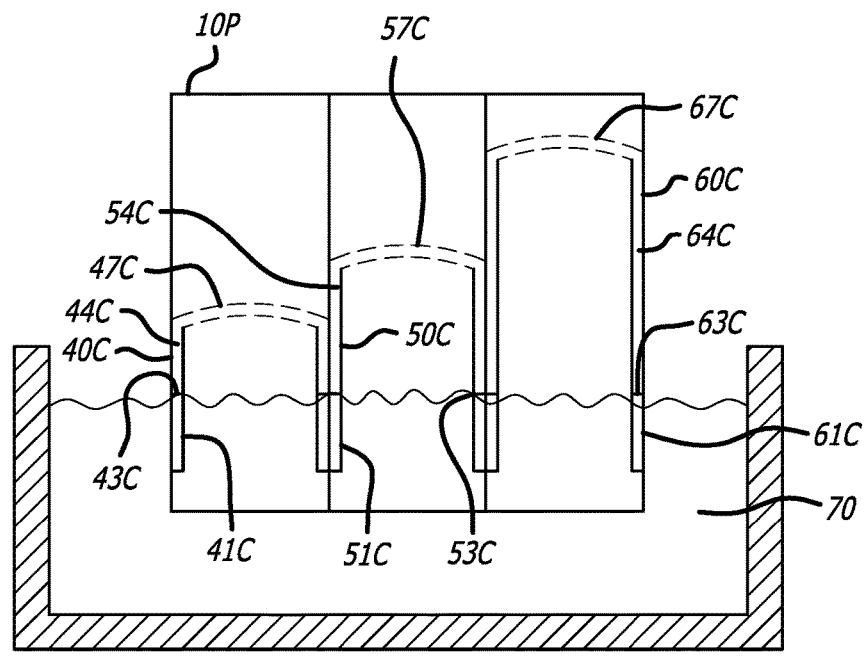
FIG. 10 is a side view showing an exemplary process for applying adhesive to the anchor portions of the acoustic inserts after they have been inserted into the honeycomb to form acoustic septum caps.

FIG. 10 shows a portion of the honeycomb 10P in which the first, second and third planar acoustic inserts have been located in the honeycomb cells to form a first acoustic septum cap 40C, second acoustic septum cap 50C and third acoustic septum cap 60C. The identifying numbers in FIG. 4 match the identifying numbers in FIG. 3, except that "C" has been added to indicate that the planar septum inserts have been formed into acoustic septum caps during the insertion process. The anchor portions 41C, 51C and 61C are all located at the same anchoring depth so that the pool of adhesive 70 covers them equally. The different depth control distances result in the septum portions 47C, 57C and 67C being located at different depths within the acoustic honeycomb in order to provide the desired multiple degrees of freedom.

Figure 11:
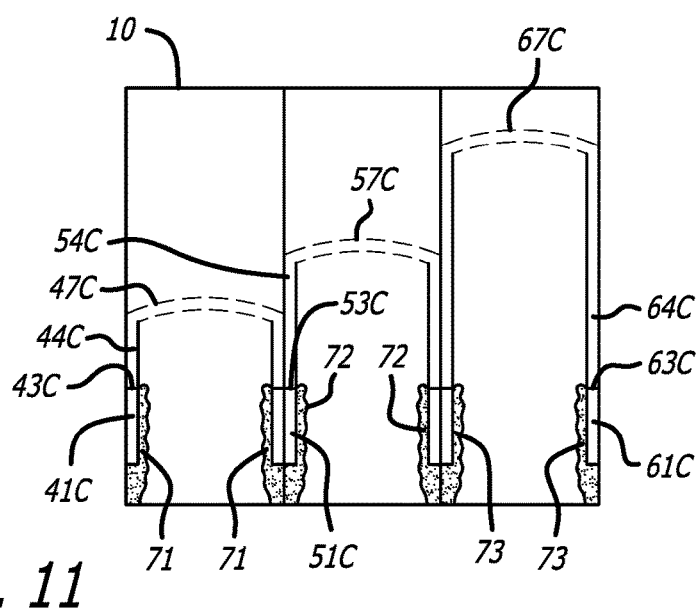
FIG. 11 is a side view showing the honeycomb after the acoustic septum caps have been bonded in place.

The honeycomb 10P is removed from the adhesive pool 70 and the liquid adhesive is allowed to dry or cure to form the honeycomb 10. In honeycomb 10, the acoustic septum caps 40C, 50C and 60C are permanently bonded to the honeycomb by adhesive at 71, 72 and 73, respectively, as shown in FIG. 11. Any of the liquid adhesives typically used to bond septum caps to honeycomb walls may be used. Preferred liquid adhesives include those that are stable at high temperature (150-200° C.). Exemplary liquid adhesives include epoxies, acrylics, phenolics, cyanoacrylates, bismaleimides, polyamide-imides, and polyimides.

In FIG. 9, the anchoring distances AD1, AD2 and AD3 for the three inserts are shown as being the same. The anchoring distances are determined by the location of the septum within the cell and the depth of dipping into the adhesive pool 70. As shown in FIG. 10, the bottom edges of the septum inserts are all located at the same depth so that the adhesive is applied over the same anchoring distances up to the interior boundaries 43C, 53C and 63C. In order for the septum portions to be located at different depths in the cell, the depth control distances must be varied. As a result, the combined anchoring and depth control distances for the septums will vary.

If desired, a set of septums may be used where the combined overall anchoring distance and depth control distance is the same for each septum of the set. In this case, the bottom of the septa are located at different depths within the cell, which inherently places the septum portions at different depths. The anchoring distances for the septa are different because the interior boundaries are all at the same depth, as controlled by the level of the adhesive pool during adhesive application, while the bottoms or perimeters of the septa are located at different depths. Since the combined anchoring distance and depth control distance is the same for each septum of the set, the difference in anchoring distance creates differences in the depth control distances, which is the portion of the septum located between the interior boundary and the septum portion. This difference in depth control distances, which occurs due to varying the anchoring distance, provides location of the septum portions at different depth using a single adhesive application step and a septum set where all of the septum caps have the same tail length (AD+DCD).

Figure 12:
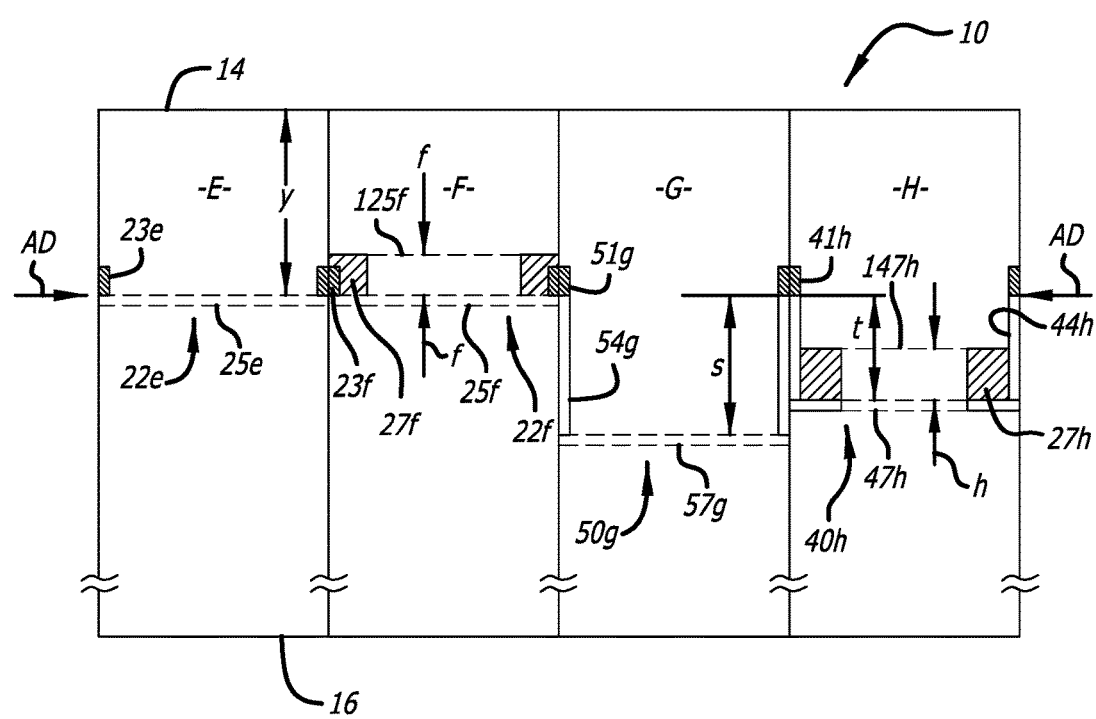
FIG. 12 is a side diagrammatic view showing a stepped acoustic structure where both steps and depth control portions are used in accordance with the present invention.

FIG. 12 is a diagrammatic side view of four other exemplary cells E, F, G and H which are located in the stepped acoustic honeycomb 10 and which demonstrate the combined use of steps and depth control portions to provide an acoustic structure having multiple degrees of freedom. The interior boundary of the anchor portion for each of the septum caps is located at the same depth (anchor depth) as shown by arrows "AD". Septum cap 22e is located in cell E and includes an anchor portion 23e and a septum portion 25e. There is no depth control portion. Accordingly, the DCD for septum cap 22e is 0. The septum portion depth is shown as "y". Septum cap 22f is located in cell F and includes an anchor portion 23f, septum portion 25f and a cylindrical insert step 27f that provides a 25% reduction in the cross-sectional area of the cell. Septum cap 22f does not include a depth control portion. Accordingly, the DCD for septum cap 22f is also 0. The septum depth for septum portion 25f is also y. The effective acoustic septum depth for cell F is shown at 125f. The effective acoustic septum depth 125f provides the cell with an acoustic impedance plot that closely matches the acoustic impedance plot of the non-stepped septum portion 25e if septum portion 25e is located at a septum depth of y−f.

Septum cap 50g is located in cell G and includes an anchor portion 51g, a septum portion 57g and depth control portion 54g that has a distance or depth of "s". The septum depth for septum portion 57g is equal to y+s. Septum cap 40h is located in cell H and includes an anchor portion 41h, septum portion 47h and a depth control portion 44h that has a distance or depth of "t". The septum depth for septum portion 4711 is equal to y+t. A cylindrical step 2711 is included in cell H to provide a 25% reduction in the cross-sectional area of the cell. The effective acoustic septum depth for cell H is shown at 147h. The effective acoustic septum depth 147h provides the cell with an acoustic impedance plot that closely matches the acoustic impedance plot of a non-stepped cell where the septum portion has the same cross-sectional area as cell H, but where the septum portion is located at a septum depth of y+t−h. The depth control distances s and t are shown in FIG. 12 as being different for exemplary purposes. The two septum depths t and s can be the same. It is preferred that the depth control distances s and t are each between 0.10 inch (0.25 cm) and 1.0 inch (2.5 cm).

The exemplary cell configurations shown in FIG. 12 make it possible to easily and accurately provide a wide variety of actual and effective septum depths while only using one application of adhesive to bond the septum caps in place. Many alternatives and combinations are possible depending upon the selection of desired parameters including: 1) depth for AD; 2) septum portion depths y, y+s and y+t; and 3) effective septum depths (y−f) and (y+t−h), as controlled by the selection of the thickness of the cylindrical wall of the cylindrical step, which determines the reduction in cross-sectional area of the cell, and the length of the cylindrical step.

The materials used to make the honeycomb 10 can be any of those typically used in acoustic structures including metals, ceramics and composite materials. Exemplary metals include aluminum and aluminum alloys. Exemplary composite materials include fiberglass, Nomex® and various combinations of graphite or ceramic fibers with suitable matrix resins. Matrix resins that can withstand relatively high temperatures (150 to 200° C.) are preferred. The materials used to make the solid acoustic barrier sheet 26 can also be any of the solid face sheet materials commonly used for acoustic structures which typically include the same type of materials used to make the honeycomb structure. The materials used to make the porous face sheet 24 can also be any of the materials commonly used for such porous structures provided that the pores or perforations in the structure are sufficient to allow the sound waves from the jet engine or other noise source to enter into the acoustic cells or resonators.

The anchor portions and septum depth control portions of the acoustic inserts are preferably made from a thin solid plastic film that is sufficiently flexible to be folded to form the acoustic septum caps. These thin solid films can be made from polyamide, such as polyamide 6 (Nylon 6, PA6) and polyamide 12 (Nylon 12, PA12), polyester, polyethylene chlorotrifluoroethylene (ECTFE), ethylene tetrafluoroethylene (ETFE), polytetrafluoroethylene (PTFE), polyphenylene sulfide (PPS), polyfluoroethylene propylene (FEP) and polyether ether ketone (PEEK). Thin sheets or films of PEEK are preferred. Such solid films are available commercially from a number of sources, such as Victrex USA (Greenville, S.C.) which produces sheets of PEEK under the tradename VICTREX® PEEK™ polymer. The films used to make the anchor portions and septum depth control portions will typically have a thickness of from 0.001 to 0.006 inch. The films may be perforated to reduce weight and to also increase the surface area of the film for adhesive bonding of the anchor portion to the cell wall.

The anchor portion and septum depth control portion of a given acoustic insert are preferably made from a single piece of plastic film. The interior anchor boundary of the anchor portion and the exterior boundary of the septum depth control portion coincide with each other (see 43, 53 and 63). The various planar acoustic inserts in a given set of inserts are pushed into the honeycomb cells so that the coincident boundaries of the anchor portions and septum depth control portions are at the same depth or at least close enough to the same depth that a single application of liquid adhesive to the anchor portions is possible. This insures that the septum portions will be located at varying depths within the honeycomb cells to provide an acoustic structure with multiple degrees of freedom.

The anchoring distances for the anchor portions of the planar acoustic inserts will typically range from 0.01 inch (0.025 cm) to 0.50 inch (1.27 cm). The depth control distances for the septum depth control portions for such acoustic structures will typically range from 0 (when no depth control portion is included in the septum cap) up to 1.0 inch (2.5 cm) and higher for particularly thick acoustic honeycomb. The difference in depth control distances between different planar acoustic inserts can vary widely and is limited by the depth of the honeycomb cell, the anchoring distances, the location of the anchor portion within the cell and the desired multiple degrees of acoustic freedom.

The septum portion of the acoustic insert is preferably made from an open mesh fabric that is woven from monofilament fibers. The fibers may be composed of glass, carbon, ceramic or polymers. Monofilament polymer fibers made from polyamide, such as polyamide 6 (Nylon, 6 PA6) and polyamide 12 (Nylon 12, PA12), polyester, polyethylene chlorotrifluoroethylene (ECTFE), ethylene tetrafluoroethylene (ETFE), polytetrafluoroethylene (PTFE), polyphenylene sulfide (PPS), polyfluoroethylene propylene (FEP), polyether ether ketone (PEEK), are a few examples. It is preferred that the material used to make the septum portion match the material that is used to make the anchor portion and septum depth control portion. Open mesh fabric made from PEEK is preferred for high temperature applications. Open mesh acoustic fabrics and other acoustic materials that may be used to form the septum caps in accordance with the present invention are available from a wide variety of commercial sources. For example, sheets of open mesh acoustic fabric may be obtained from SEFAR America Inc. (Buffalo Division Headquarters 111 Calumet Street Depew, N.Y. 14043) under the trade names SEFAR PETEX, SEFAR NITEX and SEFAR PEEKTEX.

The combination of a septum portion made from an open mesh fabric with an anchor portion and septum depth control portion made from a solid film of plastic provides a preferred combination of acoustic properties and septum strength. Especially preferred are combinations of PEEK open mesh fabric septum portions with anchor and septum portions that are PEEK solid film. The PEEK open mesh fabric septum portions, when combined with the solid plastic anchor and depth control portions, are flatter and more uniform in shape than the acoustic portion of a septum made entirely from mesh. The flatter septum portions make it possible to create acoustic structures where the depth of the septum portions are uniform and can be carefully controlled.

The septum portion is attached to the septum depth control portion along the septum boundary (e.g. 46, 56 and 66 in FIG. 9) of the septum depth control portions. It is preferred that this attachment is achieved by welding the septum depth control portion to the septum portion. Welding is accomplished using known welding techniques for joining two pieces of plastic together. The septum portion may also be attached to the septum depth control portion using an adhesive.

In those cells where the septum portion has the same cross-sectional area as the cell, the open mesh fabric is welded or otherwise directly connected to the anchor portion when no depth control portion is included. The open mesh fabric is connected to the depth control portion, if present. A step can be provided by extending the solid film from the anchor portion or depth control portion into the septum portion to reduce the cross-sectional area of the open mesh fabric by the desired amount. However, it is preferred that a circular ring or cylinder is inserted to provide control of the reduction in cross-sectional area of the open mesh fabric and to enhance control of insertion depths.

In those situations where the entire septum cap is made from open mesh fabric, the step is preferably formed by inserting a ring or collar to the desired septum depth either before, after or during insertion of the all-mesh septum cap.

The planar acoustic inserts may include one or more inserts that have septum portions made from a solid polymer film of the type used for the anchoring portions and septum depth control portions. The inclusion of such solid planar acoustic inserts allows one to locate acoustic barriers at different depths in the cells at the same time as the other mesh-containing acoustic inserts from the set are placed in the honeycomb. The same single adhesive application step can then be used to bond both the solid acoustic inserts of the set along with the mesh-containing acoustic inserts because they all are anchored at the same anchoring depth.

When the entire septum cap is made from a solid film, the septum portion can be formed by drilling holes through the film. The holes may be drilled using a laser or other suitable hole drilling system.

The septum portion may be in any shape that is typically used in acoustic structures. The septum may be in the form of a circular disk as shown in FIG. 9. The septum may also be in the shape of an ellipse or oval. The septum portion may also be in the shape of a polygon, such as a square, rectangle, hexagon or octagon.

The cross-sectional area of a septum portion made from acoustic mesh is close to or equal to the cross-sectional area of the honeycomb cells when no step is used. The use of steps that reduce the cross-sectional area of the cell and the acoustic mesh from 20 to 85 percent of the cell cross-sectional area provide an effective reduction in the acoustic septum depth on the order of from 0.05 inch (0.13 cm) to 0.25 inch (0.64 cm). This reduction in effective acoustic depth is not obtained by simply varying the acoustic properties of the mesh. For example, simulation studies were conducted comparing the impedance plots of septum portions that are made from different acoustic mesh. Impedance plots were obtained for septum caps at a septum depth of 0.450 inch (1.14 cm) where the caps are made from mesh having an NLF of 1.6 and rayl values of 70 and 120. An impedance plot was also obtained for a septum cap having a septum depth of 0.400 inch (1.02 cm) that was made from mesh having an NLF of 1.6 and a rayl value of 80. The cross-sectional areas of the septum portions were all the same and equal to the cross-sectional area of the cell. The impedance plots of the 70 and 120 rayl mesh did not closely match the impedance plot of the 80 rayl mesh. This demonstrates that changing the rayl value of the mesh does not achieve the same reduction in effective septum depth (0.050 inch (0.13 cm)) that is provided by the present invention where a 20% reduction in the cross-sectional area of the cell provided by a cylindrical insert results in an effective reduction of 0.050 inch (0.13 cm) in the septum depth.

It is preferred that acoustic mesh having the same or similar rayl values and nonlinear factors be used the cells in order to ensure that the desired differences in actual and effective acoustic impedance between cells is achieved using steps and depth control portions in accordance with the present invention.

Figure 14:
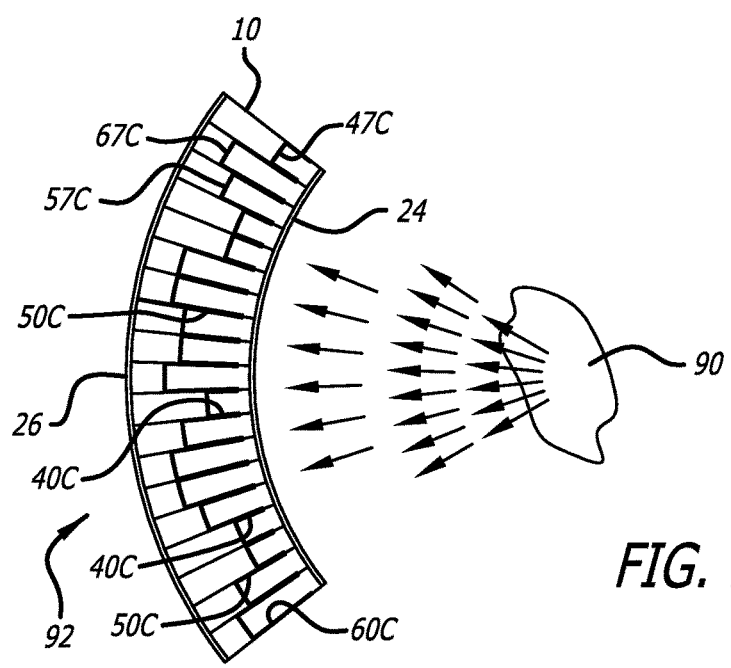
FIG. 14 shows an exemplary acoustic structure in accordance with the present invention in place for attenuating sound from a source of noise.

Although the acoustic structure of the present invention may be used for damping noise from a wide variety of noise sources, the acoustic structure is particularly well-suited for damping noise generated by aircraft engines and particularly the large engines used for commercial aircraft. Accordingly, the acoustic structure shown in FIG. 13 is typically part of a nacelle which surrounds the central core of a turbofan jet engine represented generally at 90 in FIG. 14. The location of various exemplary septum caps 40C, 50C and 60C, which are formed from the exemplary set of planar acoustic inserts, are shown in position within the honeycomb 10 where they have been anchored at the same depth. The various septum portions 47C, 57C and 67C include depth control portions so that some of the septum portions are located at different depths within the honeycomb and cylindrical inserts are located in some of the cells to achieve desired reductions in cell cross-sectional area to provide the nacelle with multiple degrees of acoustic freedom.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A stepped acoustic structure in which acoustic septum caps are located in the cells of a stepped-honeycomb so that the acoustic impedance of at least two of the cells is different to provide the stepped-acoustic structure with multiple degrees of freedom for reducing the noise generated from a source, said stepped acoustic structure comprising:
   A) a honeycomb comprising a first edge to be located closest to said source and a second edge, said honeycomb comprising a plurality of walls that extend between said first and second edges, said walls defining a first cell and a second cell wherein each of said first and second cells has the same cross-sectional area measured perpendicular to said walls;
   B) an acoustic barrier located at the second edge of said honeycomb or within said first or second cells to form a first acoustic resonator and a second acoustic resonator wherein the depth of each of said first and second acoustic resonators is equal to the distance between the first edge of said honeycomb and said acoustic barrier;
   C) a first acoustic septum cap comprising:
      a) a first anchor portion for anchoring said first acoustic septum cap to the walls of said first cell, said first anchor portion having an outer edge and a first anchor boundary that is spaced from the outer edge of said first anchor portion a first anchoring distance, said first anchor portion being bonded to said walls and extending parallel thereto and wherein said first anchor boundary is located at a first anchor depth within said first cell;
      b) a first septum portion extending transverse to the walls of said first cell and having a cross-sectional area that is equal to the cross-sectional area of said first cell and wherein said first septum portion is located at a first septum depth such that said first cell has a first acoustic impedance;
   D) a second acoustic septum cap comprising:
      a) a second anchor portion for anchoring said second acoustic septum cap to the walls of said second cell, said second anchor portion having an outer edge and a second anchor boundary that is spaced from the outer edge of said second anchor portion a second anchoring distance, said second anchor portion being bonded to said walls and extending parallel thereto, said second anchor boundary being located at a second anchor depth within said second cell wherein said second anchor depth is equal to said first anchor depth:
      b) a second septum portion extending transverse to said walls and having a cross-sectional area wherein said second septum portion is located at a second septum depth; and
   E) a step attached to the walls of said second cell that reduces the cross-sectional area of said second cell at said second septum depth an amount that is equal to from 10 to 85 percent of the cross-sectional area of said second cell whereby said second cell has a second acoustic impedance that is sufficiently different from said first acoustic impedance to provide said stepped acoustic structure with multiple degrees of freedom for reducing the noise generated from a source.

2. A stepped acoustic structure according to claim 1 wherein said first septum depth is equal to said second septum depth and wherein said second acoustic impedance matches the acoustic impedance that would be provided by said first resonator if said first septum portion was located closer to the first edge of said honeycomb than said second septum portion.

3. A stepped acoustic structure according to claim 2 wherein the depth of each of said first and second acoustic resonators is between 1 inch (2.5 cm) and 3 inches (7.5 cm).

4. A stepped acoustic structure according to claim 3 wherein said second acoustic impedance matches the acoustic impedance that would be provided by said first acoustic resonator if said first septum portion was located from 0.01 inch (0.025 cm) to 0.25 inch (0.64 cm) closer to the first edge of said honeycomb than said first septum depth.

5. A stepped acoustic structure according to claim 1 wherein said step reduces the cross-sectional area of said second cell at said second septum depth an amount that is equal to from 20 to 85 percent of the cross-sectional area of said second cell.

6. A stepped acoustic structure according to claim 4 wherein said step reduces the cross-sectional area of said second cell at said second septum depth an amount that is equal to from 20 to 85 percent of the cross-sectional area of said second cell.

7. A stepped acoustic structure according to claim 1 wherein said first septum cap includes a first septum depth control portion located between said first septum portion and said first anchor portion, said first depth control portion extending parallel to said walls and comprising an exterior boundary that coincides with said first anchor boundary and a first septum boundary located around said first septum portion wherein said first septum boundary is spaced from the first exterior boundary a first depth control distance so that said first septum depth is greater than said second septum depth.

8. A stepped acoustic structure according to claim 7 wherein said first septum control distance is from 0.25 inch (0.64 cm) to 2 inches (5 cm).

9. A stepped acoustic structure according to claim 1 wherein the walls of said honeycomb define a third cell and a fourth cell wherein each of said third and fourth cells has the same cross-sectional area measured perpendicular to said walls and wherein said acoustic barrier is located at the second edge of said honeycomb or within said third or fourth cells to form a third acoustic resonator and a fourth acoustic resonator wherein the depth of each of said third and fourth acoustic resonators is equal to the distance between the first edge of said honeycomb and said acoustic barrier, said stepped acoustic structure comprising:
  A) a third acoustic septum cap comprising:
    a) a third anchor portion for anchoring said third acoustic septum cap to the walls of said third cell, said third anchor portion having an outer edge and a third anchor boundary that is spaced from the outer edge of said third anchor portion a third anchoring distance, said third anchor portion being bonded to said walls and extending parallel thereto and wherein said third anchor boundary is located at a third anchor depth within said third cell, said third anchor depth being equal to said first anchor depth;
    b) a third septum portion extending transverse to the walls of said third cell and having a cross-sectional area that is equal to the cross-sectional area of said third cell and wherein said third septum portion is located at a third septum depth such that said third acoustic resonator has a third acoustic impedance;
    c) a third septum depth control portion located between said third septum portion and said third anchor portion, said third depth control portion extending parallel to said walls and comprising an exterior boundary that coincides with said third anchor boundary and a third septum boundary located around said third septum portion wherein said third septum boundary is spaced from the third exterior boundary a third depth control distance such that said third septum depth is greater than said first septum depth;
  B) a fourth acoustic septum cap comprising:
    a) a fourth anchor portion for anchoring said fourth acoustic septum cap to the walls of said fourth cell, said fourth anchor portion having an outer edge and a fourth anchor boundary that is spaced from the outer edge of said fourth anchor portion a fourth anchoring distance, said fourth anchor portion being bonded to said walls and extending parallel thereto and wherein said fourth anchor boundary is located at a fourth anchor depth within said fourth cell, said fourth anchor depth being equal to said first anchor depth;
    b) a fourth septum portion extending transverse to the walls of said fourth cell and having a cross-sectional area and wherein said fourth septum portion is located at a fourth septum depth such that said fourth acoustic resonator has a fourth acoustic impedance;
    c) a fourth septum depth control portion located between said fourth septum portion and said fourth anchor portion, said fourth depth control portion extending parallel to said walls and comprising an exterior boundary that coincides with said fourth anchor boundary and a fourth septum boundary located around said fourth septum portion wherein said fourth septum boundary is spaced from the fourth exterior boundary a fourth depth control distance;
  E) a step attached to the walls of said fourth cell that reduces the cross-sectional area of said fourth cell at said fourth septum depth an amount that is equal to from 10 to 85 percent of the cross-sectional area of said fourth cell whereby said fourth cell has a fourth acoustic impedance that is sufficiently different from said third acoustic impedance to provide said stepped-acoustic structure with multiple degrees of freedom for reducing the noise generated from a source.

10. A stepped acoustic structure according to claim 9 wherein said third depth control distance is equal to said fourth depth control distance so that said third septum depth is equal to said fourth septum depth and wherein said fourth acoustic impedance matches the acoustic impedance that would be provided by said third resonator if said third septum portion was located closer to the first edge of said honeycomb than said fourth septum portion.

11. A stepped acoustic structure according to claim 10 wherein the depth of each of said third and fourth acoustic resonators is between 1 inch (2.5 cm) and 3 inches (7.5 cm).

12. A stepped acoustic structure according to claim 11 wherein said fourth acoustic impedance matches the acoustic impedance that would be provided by said third acoustic resonator if said third septum portion was located from 0.01 inch (0.025 cm) to 0.25 inch (0.64 cm) closer to the first edge of said honeycomb than said third septum depth.

13. A stepped acoustic structure according to claim 9 wherein said step reduces the cross-sectional area of said fourth cell an amount that is equal to from 20 to 85 percent of the cross-sectional area of said fourth cell.

14. A stepped acoustic structure according to claim 12 wherein said step reduces the cross-sectional area of said second cell an amount that is equal to from 20 to 85 percent of the cross-sectional area of said second cell.

15. A stepped acoustic structure according to claim 12 wherein said third septum control distance is from 0.64 cm to 5 cm and said fourth septum control distance is from 0.25 inch (0.64 cm) to 2 inches (5 cm).

16. A stepped acoustic structure according to claim 1 wherein said first and second septum portions comprise an acoustic mesh comprising plastic monofilament fibers.

17. A stepped acoustic structure according to claim 1 wherein said step comprises a cylindrical insert having a solid wall that is impervious to sound waves.

18. An engine nacelle comprising a stepped acoustic structure having multiple degrees of acoustic freedom according to claim 1.

19. An airplane comprising an engine nacelle according to claim 18.

20. A stepped-acoustic structure in which planar acoustic inserts are located in the cells of a stepped-honeycomb in order to reduce noise generated from a source, said stepped-acoustic structure providing the same acoustic impedance as a multi-degrees-of-freedom acoustic structure where said multi-degrees-of-freedom acoustic structure comprises a honeycomb comprising a first edge to be located closest to said source and a second edge, said honeycomb comprising a plurality of walls that extend between said first and second edges, said walls defining a first honeycomb cell and a second honeycomb cell which have the same cross-sectional area measured perpendicular to said walls and wherein a planar acoustic insert has been located in each of said first and second honeycomb cells to form a lower septum cap in said first honeycomb cell and an upper septum cap in said second honeycomb cell, said lower septum cap including a lower septum portion that extends transverse to the walls of said first honeycomb cell and wherein said upper septum cap includes an upper septum portion that extends transverse to the walls of said second honeycomb cell, said lower and upper septum portions having the same cross-sectional area and each being located at a septum depth, said septum depth being the distance between each septum portion and the first edge of said honeycomb, wherein said lower septum portion is located at a lower septum depth to provide a first honeycomb cell having a first acoustic impedance and wherein said upper septum portion is located at an upper septum depth, said upper septum depth being less than said lower septum depth to provide said second honeycomb cell with a second acoustic impedance that is different from said first acoustic impedance, said stepped acoustic structure comprising:
  A) a honeycomb comprising a first edge to be located closest to said source and a second edge, said honeycomb comprising a plurality of walls that extend between said first and second edges, said walls defining a first cell and a second cell wherein each of said first and second cells has the same cross-sectional area measured perpendicular to said walls;
  B) an acoustic barrier located at the second edge of said honeycomb or within said first or second cells to form a first acoustic resonator and a second acoustic resonator wherein the depth of each of said first and second acoustic resonators is equal to the distance between the first edge of said honeycomb and said acoustic barrier;
  C) a first acoustic septum cap comprising:
    a first anchor portion for anchoring said first acoustic septum cap to said walls at an anchoring depth within said first cell, said first anchor portion having an outer edge that defines a perimeter of said first acoustic septum cap and a first interior anchor boundary that is spaced from said perimeter a first anchoring distance, said first anchor portion being bonded to said walls and extending parallel thereto;
    a first septum portion that is bounded by said first interior anchor boundary, said first septum portion extending transverse to said walls and having a cross-sectional area that is equal to the cross-sectional area of said first cell and wherein said first septum portion is located at a first septum depth, which is the same as said lower septum depth in said multi-degrees-of-freedom acoustic structure such that said first cell has an acoustic impedance that matches the first acoustic impedance of said multi-degrees-of-freedom acoustic structure;
  D) a second acoustic septum cap comprising:
    a second anchor portion for anchoring said second acoustic septum cap to said walls at said anchoring depth within said second cell, said second anchor portion having an outer edge that defines a perimeter of said second acoustic septum cap and a second interior anchor boundary that is spaced from said perimeter a second anchoring distance, said second anchor portion being bonded to said walls and extending parallel thereto;
    a second septum portion that is bounded by said second interior anchor boundary, said second septum portion extending transverse to said walls and having a cross-sectional area and wherein said second septum portion is located at a second septum depth, said second septum depth being the same as said first septum depth; and
  E) a step attached to the walls of said second cell that reduces the cross-sectional area of said second cell at said second septum depth an amount that is equal to from 10 to 85 percent of the cross-sectional area of said second cell whereby said second cell has an acoustic impedance that matches the second acoustic impedance of said multi-degrees-of-freedom acoustic structure even though said second septum depth and said first septum depth are the same.

\* \* \* \* \*